US006467355B1

(12) United States Patent
Leong

(10) Patent No.: US 6,467,355 B1
(45) Date of Patent: *Oct. 22, 2002

(54) MOST ACCURATE METHOD OF TENSIONING THREADED FASTENERS IN ASSEMBLED UNITS

(76) Inventor: Irving Leong, P.O. Box 1485, Taylors, SC (US) 29687-1485

( * ) Notice: Subject to any disclaimer, the term of this patent is extended or adjusted under 35 U.S.C. 154(b) by 0 days.

This patent is subject to a terminal disclaimer.

(21) Appl. No.: 09/835,977

(22) Filed: Apr. 16, 2001

(51) Int. Cl.$^7$ .................................................. F16B 31/02
(52) U.S. Cl. ........................................................ 73/761
(58) Field of Search ............................... 73/761, 862.21

(56) References Cited

U.S. PATENT DOCUMENTS

| | | | | |
|---|---|---|---|---|
| 3,906,819 A | * | 9/1975 | Curtis | 173/181 |
| 4,091,664 A | | 5/1978 | Zerver | 73/139 |
| 4,185,506 A | * | 1/1980 | Exner et al. | 73/761 |
| 4,328,709 A | | 5/1982 | Schramm | 73/862.23 |
| 4,393,734 A | | 7/1983 | Thorn et al. | 81/468 |
| 4,561,332 A | | 12/1985 | Wood | 81/479 |
| 4,958,541 A | | 9/1990 | Annis et al. | 81/479 |
| 5,172,616 A | | 12/1992 | Negishi | 81/467 |
| 5,860,778 A | | 1/1999 | Keener | 411/5 |
| 5,904,081 A | | 5/1999 | Cushman et al. | 81/461 |
| 5,904,459 A | | 5/1999 | Prathap et al. | 411/6 |
| 5,911,801 A | | 6/1999 | Fravalo et al. | 81/478 |
| 5,941,141 A | | 8/1999 | Whitley | 81/63.1 |
| 5,963,707 A | | 10/1999 | Carr | 388/811 |
| 5,997,231 A | | 12/1999 | Goodwin et al. | 411/386 |
| 6,021,555 A | | 2/2000 | Leong | 29/407.03 |
| 6,041,660 A | * | 3/2000 | Fujitaka et al. | 73/826 |
| 6,167,788 B1 | | 1/2001 | Schonberger et al. | 81/467 |

* cited by examiner

*Primary Examiner*—Max Noori
(74) *Attorney, Agent, or Firm*—McNair Law Firm, P.A.

(57) ABSTRACT

A highly accurate method of tensioning threaded fasteners into assembled units is presented. A mechanical process for locating the initial point that a threaded male fastening unit enters into the female fastening unit provides a definite reference point from which angular movement of the fastener can be digitally measured with the greatest accuracy. Accurate measurement of angular rotation of a threaded unit into a receiving unit provides a direct relationship to allow an accurate measurement of the tension applied to the fastener inside the recess. Multiple fasteners can be randomly indexed to start at the zero point and be driven into the receiving unit with equal tension in each fastener in timed increments of rotation during the entire process of driving the fasteners into the fastened unit. A digital printout of the process certifies the reference numbers of all components assembled and timed movement activity of each of the assembled components.

2 Claims, 3 Drawing Sheets

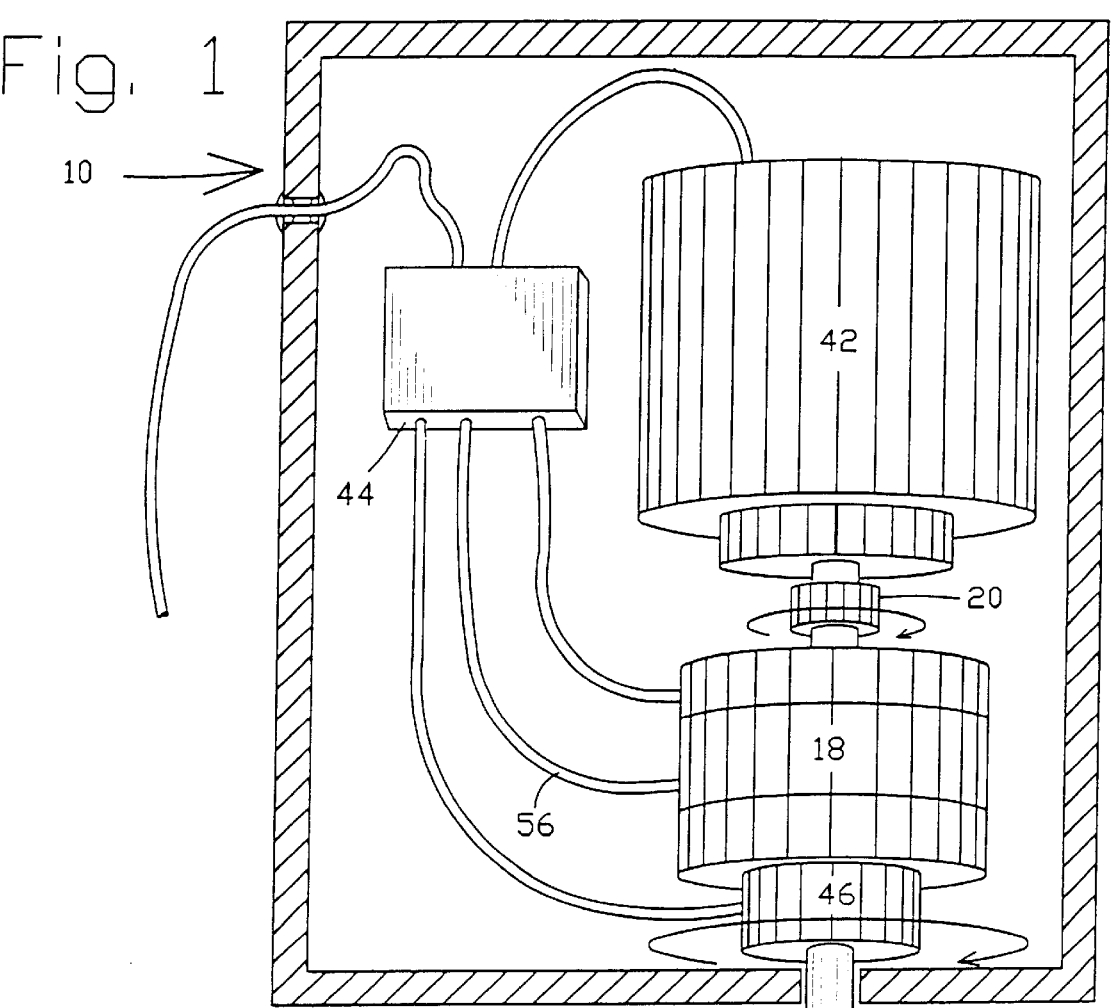
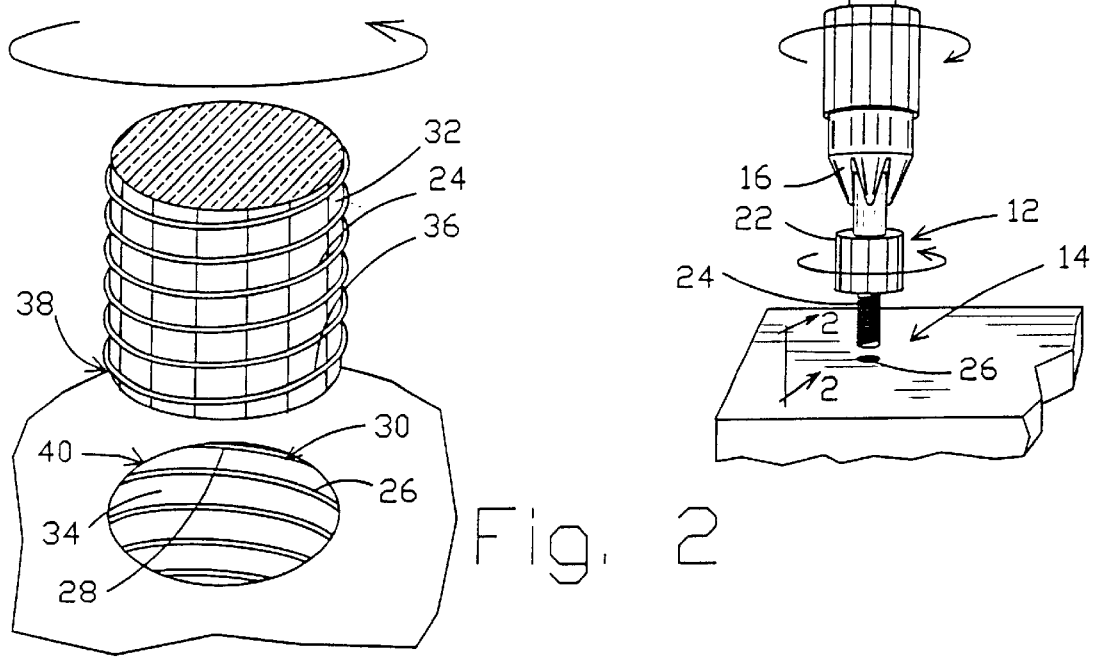

MOST ACCURATE METHOD OF TENSIONING THREADED FASTENERS IN ASSEMBLED UNITS

FIELD OF THE INVENTION

This invention relates generally to a method and apparatus for tightening a series of threaded fasteners so that all the fasteners are under the same tension forces. Specifically, the invention relates, in one embodiment, to a method for tightening the cylinder head bolts in an internal combustion engine to the same degree of tension.

BACKGROUND OF THE INVENTION

The present invention departs from prior art practices and provides an exceedingly accurate method of tensioning threaded bolts which are used to fasten or attach one element to another using bolts, technically referred to as cap screws. The tensioning system eliminates the margin of error associated with current torque wrenches and torque application systems which are. based on the measurement of "torque" or fastener tensioning through the frictional intermediate interface of the bolt and threads of the fastener receptacle. Further, the present invention allows real time equal starting, running in, and tensioning of fasteners and computer certified automated quality control of the assembly process.

To better understand the significance of the present invention, a brief description of prior art practices follows. When threaded fasteners are tightened, they are actually stretched not unlike a rubber band holding together two blocks of wood. The current method of tensioning fasteners is referred to as applying torque to the fastener. Current torque wrenches measure the force of tension applied to a lever arm at a unit radius distance away from the center axis of the fastener. In the United States the current common measurement is the foot pound. In the current method, inaccuracy is created by the friction between the threaded fastener and the threaded receptacle into which the fastener is driven. Fasteners and the threaded receptacles are most commonly alloys but may also be ceramics, cermets, plastics, or combinations of these. Alloys, which are crystalline structures, and cermet matrices are almost never homogeneous and have highly variable frictional characteristics. Forming threads in these materials not only exposes unknown surfaces, but the tools used to form the threads, further imparts unknown frictional characteristics unique to the tool marks or striae created by each unique tool. Given to the large number of variables in the materials and the screw thread forming process, measurement of fastener tensioning through the frictional interface used by current art torque wrenches will always provide a sizable percentage of error and preclude reliability in regard to definite repeated uniform tensioning of the fastener and the fastened unit.

Angular torque has been adopted virtually universally as the measure of measuring tension strain. Accuracy has increased, but the current angular torquing method still starts with a low initial starting torque value, from which torque angles are later measured and inaccuracies due to friction irregularities have not been eliminated.

Presently used torque wrenches, either hand or machine operated, are frictional compression or tension loaded devices that release when the set threshold setting is reached. These are referred to in the industry as torque limiting devices. Since these devices are based on springs and friction, they are subjected to increased inaccuracy due to repeated use and must be re-calibrated and compared to a reference which is, currently, an analog, frictional spring loaded unit.

The current method of setting up a multiple fastener assembled unit such as an engine block, a gasket and a cylinder head requires tightening individual fasteners in a spiral pattern in steps of lesser that the ultimate desired torque value, either measured by a torque wrench or an angular torque device. This method requires that the components be over designed in strength to prevent displacement or warping during the assembly process.

The current method of quality control is to have an operator place a paint mark of each fastener that he or she has securely tightened. Thus, another object of the present invention is to provide a method whereby all bolts can be tightened simultaneously and uniformity to the same tension.

DESCRIPTION OF PRIOR ART

Previous attempts to solve the problem of uniform tensioning of threaded bolts have resulted in inventions that have addressed methods of tightening threaded fasteners (bolts or cap screws) with quantitative measurement of tightness and the certification of tightened fasteners. None provide for the indexing of the actual referenced starting point of a threaded fastener into the threaded unit, the digital measurement of fastener elongation within the threaded recess and the integrated "quality control" certification of the assembled unit. For example, U.S. Pat. Nos. 3,970,155; 4,091,664; 4,328,709; 4,958,541; 5,172,616; 5,890;406; 5,911,801; and 6,021,555 are all illustrative of prior art. On the other hand, U.S. Pat. No. 6,021,555 granted to Applicant is helpful in appreciating the current invention; however, the rest of the cited art may be suitable for a particular purpose that each addresses but none would be suitable for the intended purpose of the present invention as herein described. Detailed discussion of these prior art patents is set forth below:

U.S. Pat. No. 4,328,709

Inventor: Wayne E. Shramm

Issued: May 11, 1982

This patent discloses conventional beam displacement torque wrench with an attachment that allows presetting a torque value, wherein the attachment provides an audio and a visual signal to the operator, when the preset torque is reached. The beam displacement torque wrench is well known in the prior art and measures torque as a factor of the bending of a wrench beam in relation to a reference indicator to which no bending force is applied.

U.S. Pat. No. 4,958,541

Inventor: Jeffrey R. Annis et al.

Issued: Sep. 25,1990

In this patent an analog torque limiting wrench is described which registers torque as pressure imparted upon a piezoelectric strain gauge. When a preset threshold level of strain imparted by the wrench is reached, a signal is sent to a vibration creating electric motor that provides the user with a tactile signal.

U.S. Pat. No. 5,172,616

Inventor: Masaki Negishi

Issued: Dec. 22,1992

This patent describes a device that simultaneously measures both "torque angle" and torque resistance of the threaded fastener as it is tightened into an assembled threaded recess. While this device provides a digital readout of the turning angle of the fastener being turned, the unit's primary aim is to prevent over tightening of bolts by measuring the relationship between the torque applied and the angular displacement of the fastener.

U.S. Pat. No. 5,890,406

Inventor: Brent Thorn

Issued: Apr. 6, 1999

The device disclosed is a torque wrench with an electro mechanical torque limiting release mechanism. For quality control purposes, when a preset torque is reached on the device, a felt tip marker is used to mark the bolt head to certify that the particular bolt has been correctly tightened.

U.S. Pat. No. 5,199,801

Inventor: Rene Michel Fravalo

Issued: Jun. 15, 1999

Described is a version of the well known and well used spring loaded torque limiting wrench, which releases when a preset torque level is reached. This particular device claims increased accuracy over prior release mechanisms on the basis of its unique design and components.

In these prior art devices the parameter being measured is the angular force required to turn a bolt in a threaded recess. Thus, a primary object of my invention is, instead, to measure a bolt's longitudinal position.

U.S. Pat. No. 6,021,555

Inventor: Irving Leong

Issued: Feb. 8, 2000

The disclosure of the patent is incorporated herein by reference and it provides for an automated method of starting threaded fasteners into tapped recesses. In this invention the process begins by precisely locating the initial "zero" entry point of thread engagement. Having located the initial referenced "zero" starting point, the number of turns or a purely angular torque determines the position of the bolt. The error prone frictional pre-load initial torque value is completely eliminated.

U.S. Pat. No. 6,167,788

Inventors: Heinz Schonberger et al.

Issued: Jan. 2, 2001

This invention represents the electronic duplication of the current angular process that depends on an initial pre-loaded torque, applied in a similar manner with a conventional torque wrench. Recognition of a "zero" starting point is not disclosed.

My invention and the improvements it introduces will be more fully understood from the summary of the invention and detailed description which follow.

SUMMARY OF THE INVENTION

In one aspect, the present invention involves inserting a threaded fastener into a threaded element, locating the initial zero starting point of the receptacle and fastener threads by rotating the fastener clockwise and, digitally measuring the angular degree of motion imparted upon the moving fastener to provide assured definite elongation of the fastener into the tapped hole thereby providing optimum fastening.

In one aspect, my invention is a Basic Unit for accurately tensioning threaded fasteners comprising a means for locating the initial zero starting point of a threaded unit in a threaded recess, a motor for driving a chucked threaded fastener in a clockwise direction a magnetic notched wheel having evenly divided number of segments within the 360 degrees of a circle, such notched wheel having no permanent magnetic qualities and preferably may be the notched rotor of a stepper motor; an electromagnet axial rotation sensor comprising an iron core and solenoid, such electromagnet's pole being disposed to pass across a notch of the magnetic notched wheel, and such electromagnet be part of a stepper motor; means for converting the threshold magnetic signal generated as the notch of the wheel passes over the electromagnet and converting such signal to a binary "1" signal; a means for counting the digital signal provided to an axial sensor provided for the fastener as it is driven and for converting the signal into a measurement of the driven axial distance of the fastener; and, means for counting the digital signal provided to the axial sensor as a function of the threaded fastener's stretched length inside the threaded recess after the fastener is fully driven in.

Accordingly, one object of the invention is to totally eliminate the measurement of torque or fastener tightening tension through the unknown and irregular frictional interface as has been the practice of the prior art.

Another object of the invention is to provide a digitally readable system to determine the exact position of the fastener as it is rotated and driven into a threaded receptacle. Thus, axial position determines ultimate tensioned length to fully tighten the fastener.

Another object of this invention is to provide a fully digital method of measuring torque or tension applied to a fastener and to eliminate the inaccuracy introduced by wear to torque driving machine components.

Yet another object of the invention is to provide a method of near perfect repeatability of inserting a fastener made with equal specification tolerances into a receiving fastened unit of equal specification tolerance.

A significant object of the invention is to provide simultaneous, evenly distributed, micro incremental tightening of multiple fasteners to establish a near perfect equally distributed tightening of gasketed components in assembled units. Such units can be made lighter due to minimized distortion of the components to be assembled.

An additional object of the invention is to provide an extremely accurate method of calculating the quantitative "design safety margin" for assembled units.

Another object of the invention is to provide computer certifiable quality control of the components assembled, without manual human intervention.

The aggregate object of the invention provides for a fully automated system of starting, running in, accurately tightening, and quality control certification of the assembled unit in one continuous operation.

By referring to the drawings and detailed description below it will be understood how my invention accomplishes the foregoing objects.

DESCRIPTION OF THE DRAWINGS

FIG. 1 is a perspective representation of the Basic Unit of the invention showing the motors, control unit, and chuck positioned to drive a bolt into a threaded FIG. 2 is an enlarged perspective representation of the threaded recess of FIG. 1 viewed from lines 2—2;

DETAILED DESCRIPTION

Figure 3:
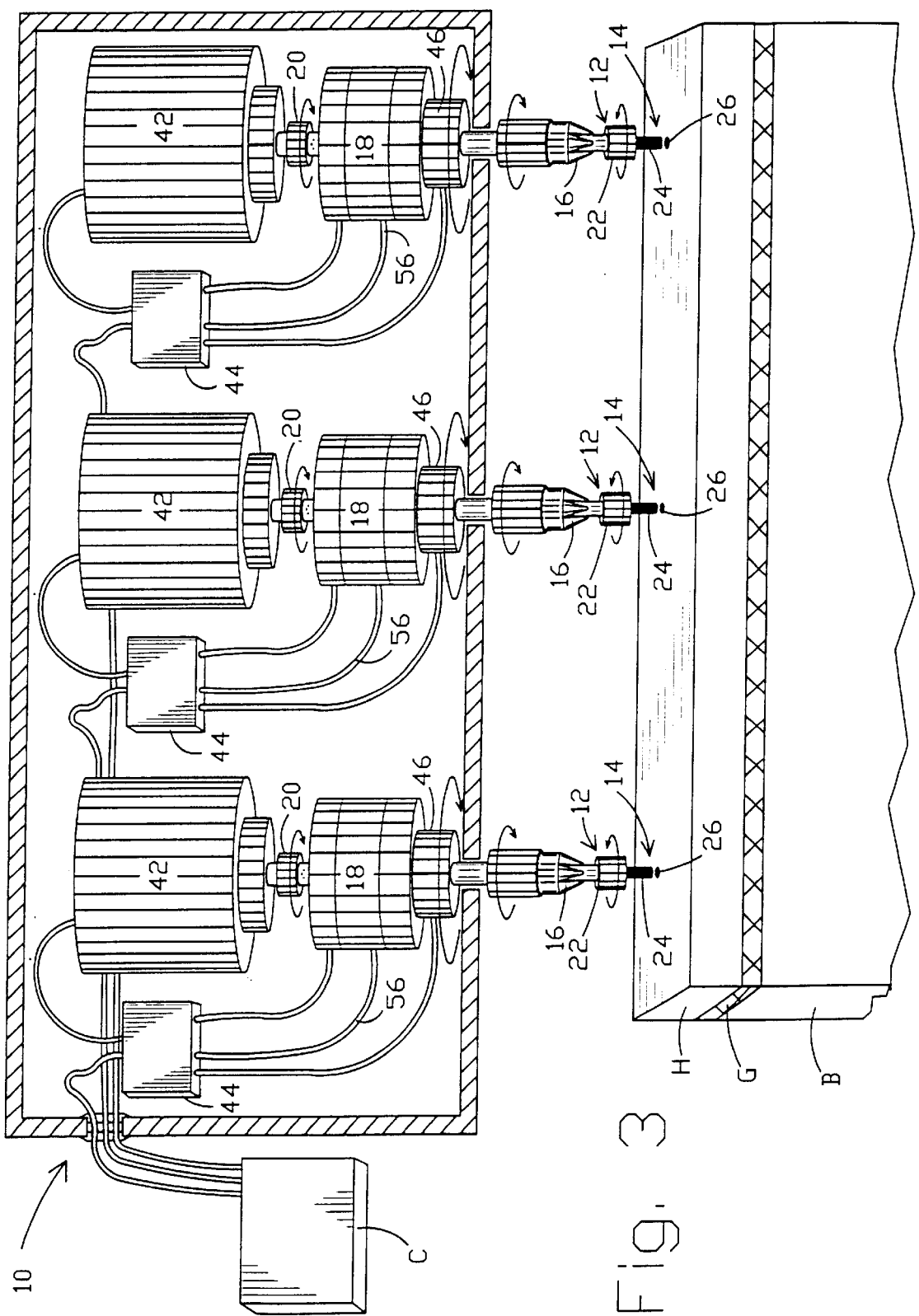
FIG. 3 is a representation of a multiplicity of the Basic Unit which forms the Gang Wrench of the invention in position to tighten the cylinder head onto an engine block.

My invention comprises of a "basic" embodiment and permutations or enhanced extended function units based on the Basic Unit. The Basic Unit is a singular bolt tightening component. The first enhanced unit is the Basic Unit constructed to provide destructive testing of fasteners. This unit is called the "Test" unit. The second enhanced unit is the "Gang Wrench" unit, which is used to evenly tighten multiple bolts into an assembled unit in unison by rotating all bolts with the same number of rotations from the zero point. The third enhanced unit is the quality control or "Certification" unit, which can be applied to both the Basic Unit and the Gang Wrench unit. These units are explained in greater detail below:

A. The Basic Unit

Referring now the FIG. 1, the Basic Unit 10 comprises high torque drive motor 42 connected to a bipolar stepper motor 18 via a clockwise engaging one way clutch 20, a vertical displacement sensor 46, a chuck 16 for the bolt 12 and a controller 44. An axial equally divided sensor 56 is connected to the controller 44 to provide a digital discrete signal to the controller to register angular position of the unit's chuck. The controller 44 is a digital computer. These components can be readily assembled by those skilled in the art upon seeing FIG. 1.

Referring to both FIGS. 1 and 2, in operation, one method of invention comprises the steps of:

1. Placing the threaded tip portion 24 of the bolt 12 chucked in the unit 10 into the threaded recess 26 with light but firm contact.

2. Moving the bolt 12 counterclockwise or to the left. Preferably, a stepper motor 18 is used to turn the bolt counterclockwise. Thus, the bolt moves axially away from the threaded recess.

3. Locating the zero point of the threads of the threaded recess. At some point from zero to 360 degrees of rotation, the tips or terminal points of the threads 36 of the bolt 12 and the threads 28 of the recess coincide. This is at point 40 where the recess threads terminate. At this point, the axial direction changes to clockwise "R."

4. Disengaging the stepper motor 18. The drive motor 42 and the axial movement sensor 56 is activated.

5. Driving the bolt into the recess. The axial movement sensor 56 provides a binary signal to the controller 44. The controller counts the discrete angular movement of the chuck and converts the angular movement into axial movement measurement into the threaded recess. The values are specific for a particular thread pitch.

6. Elongating the length of the bolt within the recess upon full insertion. The full insertion position is predetermined by first driving a test bolt into a recess and counting the revolutions from the zero point to contact the bolt head with the surface. When the bolt head 22 reaches full contact with the surface 14 around the opening of the recess further rotation continues to elongate the length of the bolt within the recess. However, the unit measures bolt tightening as a function of the stretching of the bolt inside of the recess, i.e., rotation that stretches the bolt within the recess after the bolt head contacts the surface. The unit makes every bolt driven in as if it were measured with a fully digital micrometer.

Figure 4:
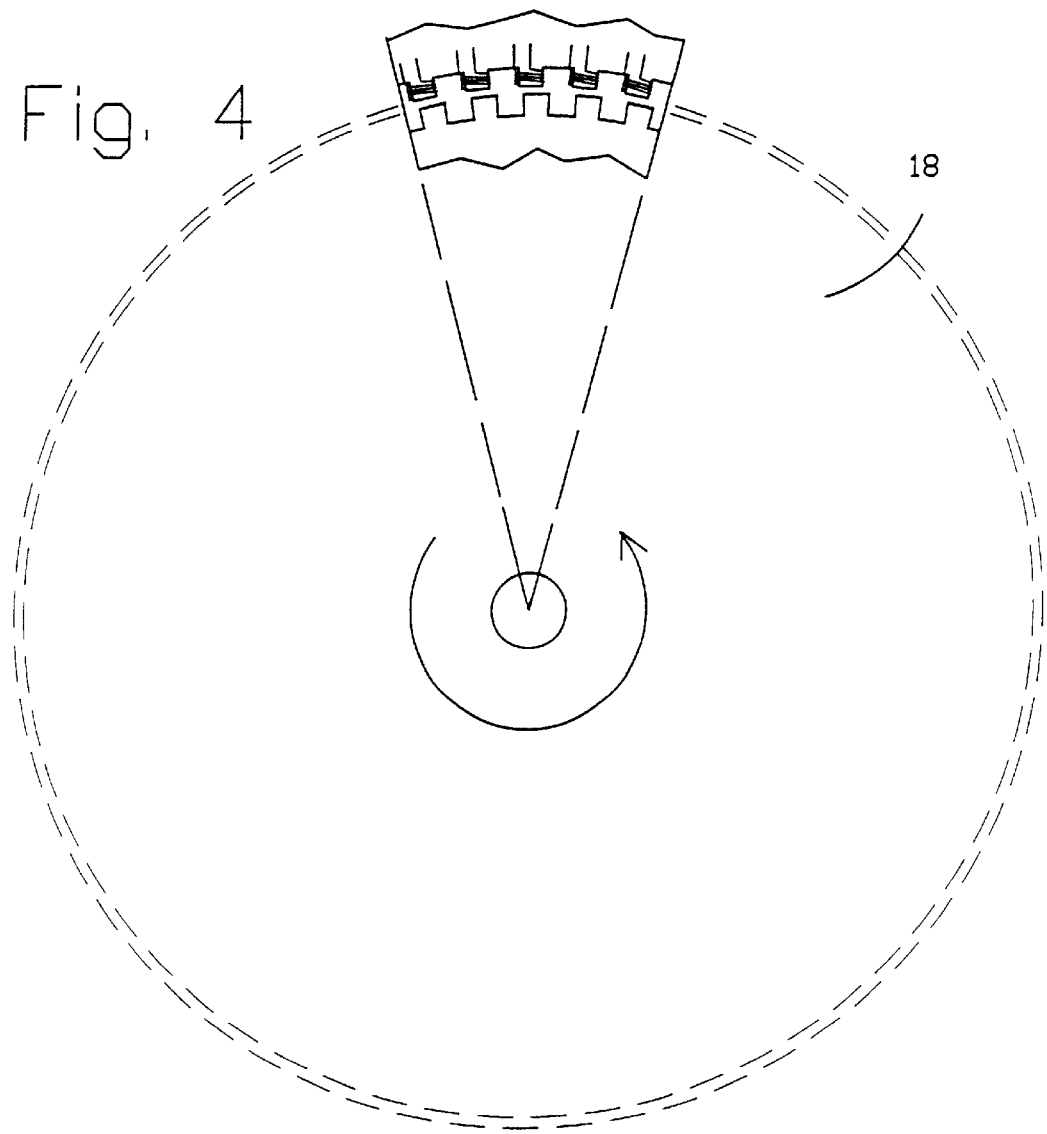
FIG. 4 is a plan view of the coils of a stepper motor with the notched timing wheel.
Figure 4A:
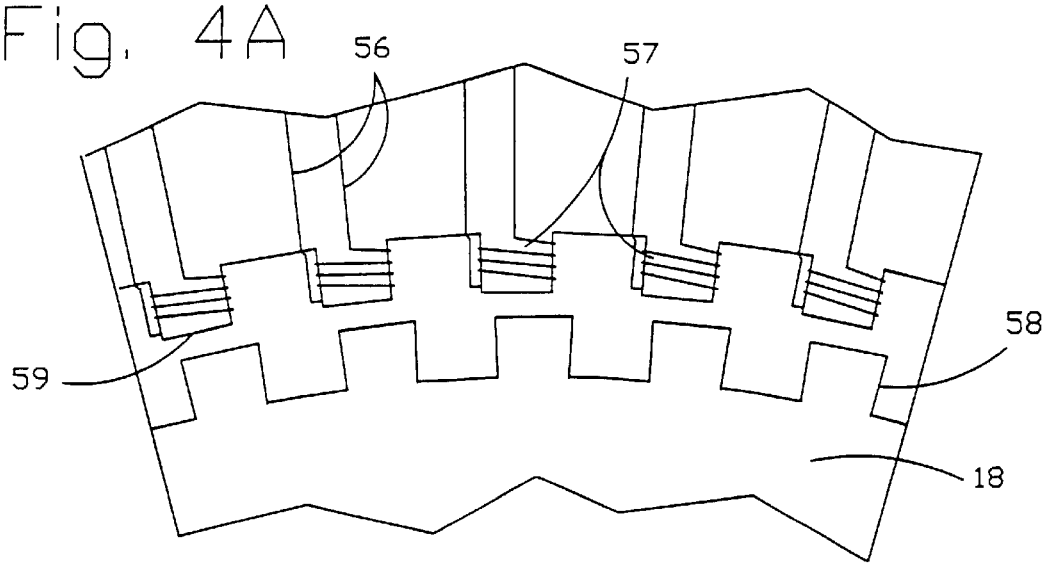
FIG. 4A is an enlarged section of the notched wheel of FIG. 4.

In a preferred embodiment, as shown in FIGS. 4 and 4A, the axial sensor 56 is represented by the leads 56 in combination with the driving coils 57 of the stepper motor, after its stepper motor driving function is disengaged. As each individual tooth 58 of the stepper motor passes by or across the particular coil 57, the magnetic field strength, measured in either in miligauss or microgauss, when reaching a threshold value, is registered as a binary "1 " to the digital controller which is incorporated in the computer. It is important that the wheel 59 with the coils 57, have no permanent magnet properties so that there is not induced or residual magnetism in the wheel 59 to interfere with the generation of current by teeth 58 as they move across or by the coils 57.

B. The Destructive Test Unit.

The destructive testing unit is used to determine the design failure length of the "stretched" fastener or bolt. Using the aforementioned Basic Unit the bolt is driven into the recess until it "snaps" or fails. At the point of failure, the elongated length of the particular bolt is recorded by the computer. Torque will no longer be measured in units such as foot pounds or newton meters. The term "percentage of elongation before failure" or "PEBF" is the parameter that is appropriate. Accordingly, instead of the customary 25% "overbuild" or structures, the percentage can be decreased, due to the greater accuracy in bolt tightening of the present invention.

C. The Gang Wrench Unit

Multiple basic units 10 can be arranged to tighten each bolt incrementally at the same time in a closure assembly where a plate-like member is bolted tight against a substrate surface. The Gang Wrench or multiple basic unit array can be applied to two or more basic units working together in unison. For the Gang Wrench unit to function in the intended purpose of the invention, all bolts driven by each basic unit for the same assembly must be identical in material length and PEBF or ultimate failure stretched length, aforementioned in the description of the test unit. The distance that each bolt is driven before head contact is made with the surface around the opening to the respective threaded recess of the assembled unit is dependent upon the uniformity of the bolts both in dimensions and in materials. Tolerances must be kept close. However, current manufacturing techniques provide such tolerances for bolts. Also, if the assembled unit includes a gasket, and its degree of compression the thickness of the gasket and its degree of compression also must be kept uniform to achieve accurate tightening of the completed assembled unit.

Turning to FIG. 3, a preferred method of operating the Gang Wrench will be described:

1. Identical bolts 24 are placed in the chuck 16 of each basic unit of the Gang Wrench, with the axis of each chuck centered over each threaded recess 26' in head 14' to receive the bolt. The location of the tip of the threads within the 360 degree circle of either the bolt or the threaded recess is random and need not be oriented at the same cardinal compass position. The Gang Wrench is placed with each bolt of the threaded recess with light but sufficient contact.

2. Each stepper motor 42 in each component basic unit 10 is engaged to move it's basic unit independently in the counter clockwise direction. As each basic unit is driven, the axial displacement sensor will provide a signal to the controller 44, when the movement of the driven fastener changes from and outward movement and drops into the recess. This detent or change in direction represents the zero reference engagement point of each bolt. At this point of each basic unit, the stepper motor 42 holds its position and is controlled by the computer controller C.

3. When all of the basic units for each driven bolt reach the zero position, all of the stepper motors are de-energized by the computer controller 44.

4. The torque driving motor in each basic unit is engaged as well as each axial sensor 56. As each torque motor drives the bolt in the tightening clockwise direction, the digital axial sensor send a signal to the computer controller C. The computer controller records both the actual discrete position of each bolt and assures that no bolt will move to the next axial increment until each Basic Unit has reached the previous same axial position from the zero reference point.

6. In equal incremental movement, all the bolts are driven to the desired stretch length inside the threaded recess with equal pressure.

D. The Quality Control Certification Unit

By bar coding each component and reading and imputing each bar coded unit prior to assembly, the entire resultant assembled unit can be certified for quality control purposes by either a computer data file or a certification print out to be delivered to the customer with the assembled unit. A desirable assembly record can be recorded by the computer controller C. These factors, for example, can be the actual time and the order that each bolt reaches the zero reference point and the actual stretch length of each bolt driven inside the threaded recess, in the case of the Gang Wrench. No longer is it necessary to manually apply or to have a system to apply a certifying mark to each bolt head. If this mark was done by a person, fatigue from repetitive task would lead to a high error rate.

E. Evaluation of A Previously Assembled Unit

This unit allows for the accurate measurement of torque applied to an assembly fastened together by any other method of torquing. This unit is a modification of the basic unit mentioned above. It comprises a device that allows the fastener to be locked to it as the fastener is withdrawn or loosened from the assembly. Tension is applied to the chuck as the fastener is withdrawn. The controller registers the fastener in its tightened assembled position as the "zero" point. As the bolt is loosened, the degree of angular movement, measured in incremental steps on the stepper motor are recorded. At a terminal point, the tip of the fastener's thread ridge will cross the tip of the tapped recess' tapped thread ridge. This measurement of the degrees of rotation used to calculate the original elongation of the fastener and the torque applied to fasten the unit. That is, the length of the withdrawn bolt or fastener can be compared to the original fastener length and the elongation that has occurred can be related to the number of turns.

Another method may be to apply the fastener in the Destructive Testing Unit to study the design of an unknown fastener. Data obtained from similar or known representative samples of the withdrawn fastener can be used to obtain valuable data of the previously assembled unit.

The foregoing description will enable those skilled in the art to readily adapt my invention for various applications, as the computers, motors and other described devices are all within the skill of those in the art to obtain and arrange once they have read my foregoing disclosure. However, my invention is limited only by the scope of the following claims.

What is claimed is:

1. A basic unit for accurately tensioning threaded fasteners in a threaded recess comprising:
    a. means for locating the initial zero starting point of a threaded fastener when positioned at the opening of a threaded recess;
    b. a motor for driving a chucked threaded fastener in a clockwise direction;
    c. a magnetic notched wheel having evenly divided number of segments of teeth and notches within the 360 degrees of a circle, said notched wheel having substantially no permanent magnetic qualities, each tooth being provided with a coil therearound;
    d. an electromagnet rotation sensor comprising an iron core and solenoid, a pole of said electromagnet being disposed for passing across the notch of the magnetic notched wheel;
    e. means for converting the threshold signal generated as a tooth of the wheel passes the electromagnet into a discrete binary "1" signal;
    f. means for counting the digital signals as they are transmitted to an axial position sensor for a fastener as it is driven and for converting the signal into a measurement of the driven axial distance of the bolt;
    g. sensor as a function thereby determining the threaded fastener's stretched length inside the threaded recess after the fastener is fully driven home.

2. The basic unit of claim 1 wherein the magnetic notched wheel and said electromagnet are components of a slipper motor.

\* \* \* \* \*